(12) United States Patent
Chin et al.

(10) Patent No.: US 7,089,754 B2
(45) Date of Patent: Aug. 15, 2006

(54) APPARATUS AND METHOD FOR CONTROLLING HEATING OPERATION IN HEAT PUMP SYSTEM

(75) Inventors: Sim Won Chin, Gwangmyeong-si (KR); Deok Huh, Gyeongsangnam-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/911,700

(22) Filed: Aug. 5, 2004

(65) Prior Publication Data

US 2005/0257557 A1    Nov. 24, 2005

(30) Foreign Application Priority Data

May 21, 2004    (KR) .................. 10-2004-0036418

(51) Int. Cl.
F25B 13/00 (2006.01)

(52) U.S. Cl. ..................... 62/324.1; 62/151

(58) Field of Classification Search ............. 62/324.1, 62/128, 305, 324.5, 151
See application file for complete search history.

(56) References Cited

U.S. PATENT DOCUMENTS 6,347,528 B1 * 2/2002 Iritani et al. ............. 62/324.6
6,357,246 B1 * 3/2002 Jin ........................... 62/238.7
6,745,583 B1   6/2004 So et al.
2004/0134205 A1   7/2004 Park et al.

* cited by examiner

Primary Examiner—Melvin Jones
(74) Attorney, Agent, or Firm—Greenblum & Bernstein, P.L.C.

(57) ABSTRACT

There is provided an air conditioner, and more particularly, an apparatus and method for controlling a heating operation in a heat pump system, in which a continuous heating operation is provided. 1. The apparatus for controlling a heating operation in a heat pump system includes: at least one compressor for compressing a refrigerant into a high-temperature and high-pressure refrigerant vapor; a passage switching unit for switching a refrigerant circulation passage depending on a heating mode or a cooling mode; an indoor heat exchanger for condensing the high-temperature and high-pressure refrigerant vapor for a heating operation or a defrosting/heating operation of the heating mode; an expansion unit through which the condensed refrigerant passes during the defrosting/heating operation; an outdoor heat exchanger for defrosting at least one tube region by using the condensed refrigerant discharged from the expansion unit; and a defrosting control unit for expanding and decompressing the refrigerant that flows between the tube regions, or for bypassing the refrigerant.

19 Claims, 12 Drawing Sheets

APPARATUS AND METHOD FOR CONTROLLING HEATING OPERATION IN HEAT PUMP SYSTEM

BACKGROUND OF THE INVENTION

1. Field of the Invention

The present invention relates to an air conditioner, and more particularly, to an apparatus and method for controlling a heating operation in a heat pump system, in which a continuous heating operation is provided.

2. Description of the Related Art

Generally, air conditioners are equipments to circulate a refrigerant through a reiteration of compression, condensation, expansion and evaporation. A combined cooling and heating air conditioner is recently developed. The combined cooling and heating air conditioner includes at least one outdoor unit and at least one indoor unit connected each other and uses a heat pump system that can selectively performs cooling and heating operations. In the air conditioner, at least one indoor unit is disposed at every installation space and a temperature of air is individually controlled at every installation space.

In the combined heating and cooling air conditioner, the cooling and heating functions are executed using a cooling cycle of flowing a refrigerant through a forward channel and a heating cycle of flowing a refrigerant through a reverse channel.

FIG. 1 is a schematic view illustrating a cooling cycle of a heat pump system according to the related art.

Referring to FIG. 1, the air conditioner includes a compressor 10, a four-way valve 11, an outdoor heat exchanger 12, an outdoor fan 13, an expansion valve 14, an indoor heat exchanger 15, and an indoor fan 16.

In the cooling operation, the compressor 10 compresses an inhaled refrigerant and discharges the refrigerant in a high-temperature and high-pressure vapor phase. The discharged refrigerant flows to the outdoor heat exchanger 12 through the four-way valve 11.

The outdoor heat exchanger 12 performs a condensation operation of exchanging heat between the refrigerant and an outdoor air using the outdoor fan 13, thereby condensing the refrigerant from the high-temperature and high-pressure vapor phase to a room-temperature and high-pressure liquid phase.

The expansion valve 14 makes the refrigerant from the outdoor heat exchanger 12 suitable for evaporation at the indoor heat exchanger 15. For this purpose, the expansion valve 14 expands the refrigerant, while creating a pressure drop.

The indoor heat exchanger 15 performs an evaporation operation of exchanging heat between an indoor air and the low-temperature and low-pressure refrigerant using the indoor fan 13. During the heat exchange, the refrigerant is expanded with reducing its pressure such that the refrigerant is evaporated into a low-temperature and low-pressure vapor phase while taking heat from the indoor air, thereby reducing a temperature of the indoor air.

The low-temperature and low-pressure refrigerant vapor from the indoor heat exchange 15 is inhaled into the compressor 10 again to complete one cycle of the cooling operation.

FIG. 2 is a schematic view illustrating a heating cycle of a heat pump system according to the related art. The heating cycle is opposite to the cooling cycle.

For the heating cycle, the four-way valve changes a flowing direction of the refrigerant in the channel (switching operation). That is, the four-way valve make a passage between the discharge side of the compressor 10 and an inlet side of the indoor heat exchanger 15.

A high-temperature and high-pressure refrigerant vapor is discharged from the compressor 10 and then the refrigerant flows to the indoor heat exchanger 15 via the four-way valve. The indoor heat exchanger 15 uses the indoor fan to facilitate a heat exchange between the high-temperature and high-pressure refrigerant vapor and an indoor air, such that the indoor air is heated and the refrigerant is condensed into a liquid phase.

The expansion valve 14 expands the refrigerant condensed at the indoor heat exchanger 15, while reducing the pressure of the refrigerant, in order to make the refrigerant suitable for evaporation. The outdoor heat exchanger 12 performs an evaporation operation of exchanging heat between an outdoor air and the refrigerant using the outdoor fan 13, thereby evaporating the refrigerant into a low-temperature and low-pressure vapor phase.

The refrigerant discharged from the outdoor heat exchanger 12 flows into the compressor 10 through the four-way valve to complete one cycle of the heating operation.

When the heat pump system performs the cooling operation, the outdoor heat exchanger 15 acts as a condenser and the indoor heat exchanger 12 acts as an evaporator. While the heat pump system performs the heating operation, the outdoor heat exchanger 15 acts as an evaporator and the indoor heat exchanger 12 acts as a condenser.

During the heating operation, frost is deposited on surfaces of tubes of the outdoor heat exchanger 12. The deposited frost disturbs the heat exchange of the outdoor heat exchanger 12, thereby reducing heat exchange efficiency and increasing heat loss and power consumption as well.

In more detail, the frost is deposited on the outdoor heat exchanger 12 when outdoor temperature is lower than a specific temperature, for example lower than 4° C. Since the frost disturbs the heat exchange, the heating operation cannot be continued. To remove the frost, the heating operation is suspended and a defrosting operation is performed through a reverse cycle (cooling cycle) for a predetermined time. Herein, there occurs a problem in the control of the indoor air, since the heating operation for heating the indoor air is suspended.

Further, referring to FIG. 3, the frosting operation is repeated with a predetermined time interval. Therefore, the frost deposited on the outdoor heat exchanger 12 is removed and efficiency drop of the outdoor heat exchanger 12 is prevented. During the defrosting operation, the indoor fan 16 is stopped and an outdoor louver is closed in order not to incur displeasure of user. Nevertheless, since the heating operation is discretely performed owing to the defrosting operation, the user feels displeasure.

Furthermore, since the heating operation and the defrosting operation are repeated periodically, the compressor 10 also repeats its driving and stopping operations frequently, so that compression loss of the compressor is generated

SUMMARY OF THE INVENTION

Accordingly, the present invention is directed to an apparatus and method for controlling a heating operation in a heat pump system that substantially obviates one or more problems due to limitations and disadvantages of the related art.

An object of the present invention is to provide an apparatus and method for controlling a heating operation in a heat pump system, in which a continuous heating operation is provided.

Another object of the present invention is to provide an apparatus and method for controlling a heating operation in a heat pump system, which can perform a defrosting/heating operation during a heating cycle in a heating mode.

A further another object of the present invention is to provide an apparatus and method for controlling a heating operation in a heat pump system, in which a high-temperature and high-pressure refrigerant passed through an expansion unit flows to a tube region of an outdoor heat exchanger to defrost the tube region, then the refrigerant being expanded and decompressed to be evaporated at the other tube region of the outdoor heat exchanger, such that a heating operation is unceasingly performed by using the outdoor heat exchanger in which the defrosting and the evaporation are performed at the same time.

A yet further another object of the present invention is to provide an apparatus and method for controlling a heating operation in a heat pump system, in which a refrigerant passage between an expansion unit and an outdoor heat exchanger can be switched in order to defrost in sequence an inlet tube region and an outlet tube region of the outdoor heat exchanger.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided an apparatus for controlling a heating operation in a heat pump system. The apparatus includes: at least one compressor for compressing a refrigerant into a high-temperature and high-pressure refrigerant vapor; a passage switching unit for switching a refrigerant circulation passage depending on a heating mode or a cooling mode; an indoor heat exchanger for condensing the high-temperature and high-pressure refrigerant vapor for a heating operation or a defrosting/heating operation of the heating mode; an expansion unit through which the condensed refrigerant passes during the defrosting/heating operation; an outdoor heat exchanger for defrosting at least one tube region by using the condensed refrigerant discharged from the expansion unit; and a defrosting control unit for expanding and decompressing the refrigerant that flows between the tube regions, or for bypassing the refrigerant.

In another embodiment of the present invention, there is provided an apparatus for controlling a heating operation in a heat pump system. The apparatus includes: at least one compressor for compressing a refrigerant into a high-temperature and high-pressure refrigerant vapor; a passage switching unit for switching a refrigerant circulation passage depending on a heating mode or a cooling mode; an indoor heat exchanger for condensing the high-temperature and high-pressure refrigerant vapor for a heating operation or a defrosting/heating operation of the heating mode; an expansion unit through which the condensed refrigerant passes during the defrosting/heating operation; an outdoor heat exchanger for defrosting at least one tube region by using the condensed refrigerant that have passed the expansion unit; a defrosting control unit for expanding and decompressing the refrigerant that flows between the tube regions, or for bypassing the refrigerant for the heating mode; a defrosting passage switching valve for switching a refrigerant passage formed between the expansion unit and the outdoor heat exchanger in order to defrost the tube regions of the heat exchanger in turn; and a control unit for controlling the expansion unit, the defrosting control unit, and the defrosting passage switching valve according to the heating operation or the defrosting/heating operation.

In a further another embodiment of the present invention, there is provided a method for controlling a heating operation in a heat pump system provided with a compressor, a passage switching unit, an indoor heat exchanger, an outdoor heat exchanger, and expansion unit. The method includes: performing a heating operation using a heating cycle; and performing a defrosting/heating operation of defrosting one side of the outdoor heat exchanger and evaporating the other side of the outdoor exchanger in turn.

The defrosting/heating operation includes: checking whether or not the defrosting/heating operation is carried out during the heating operation; if the defrosting/heating operation is carried out, passing a refrigerant condensed at the indoor heat exchanger through the expansion unit, and defrosting the inlet tube region of the outdoor heat exchanger using the passed refrigerant; expanding and decompressing the refrigerant using an expansion valve, the expansion valve being installed between the tube regions of the outdoor heat exchanger; and evaporating the expanded and decompressed refrigerant at the outlet tube region of the outdoor heat exchanger.

According to the present invention, the tube regions of the outdoor heat exchanger can be switched in turn for a defrosting, such that the heating operation can be continuously performed and the compressor is not required to be stopped or restarted for the defrosting.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings An apparatus for controlling a heating operation in a heat pump system according to the preferred embodiments of the present invention will now be described with reference to the accompanying drawings.

FIRST EMBODIMENT

Figure 1:
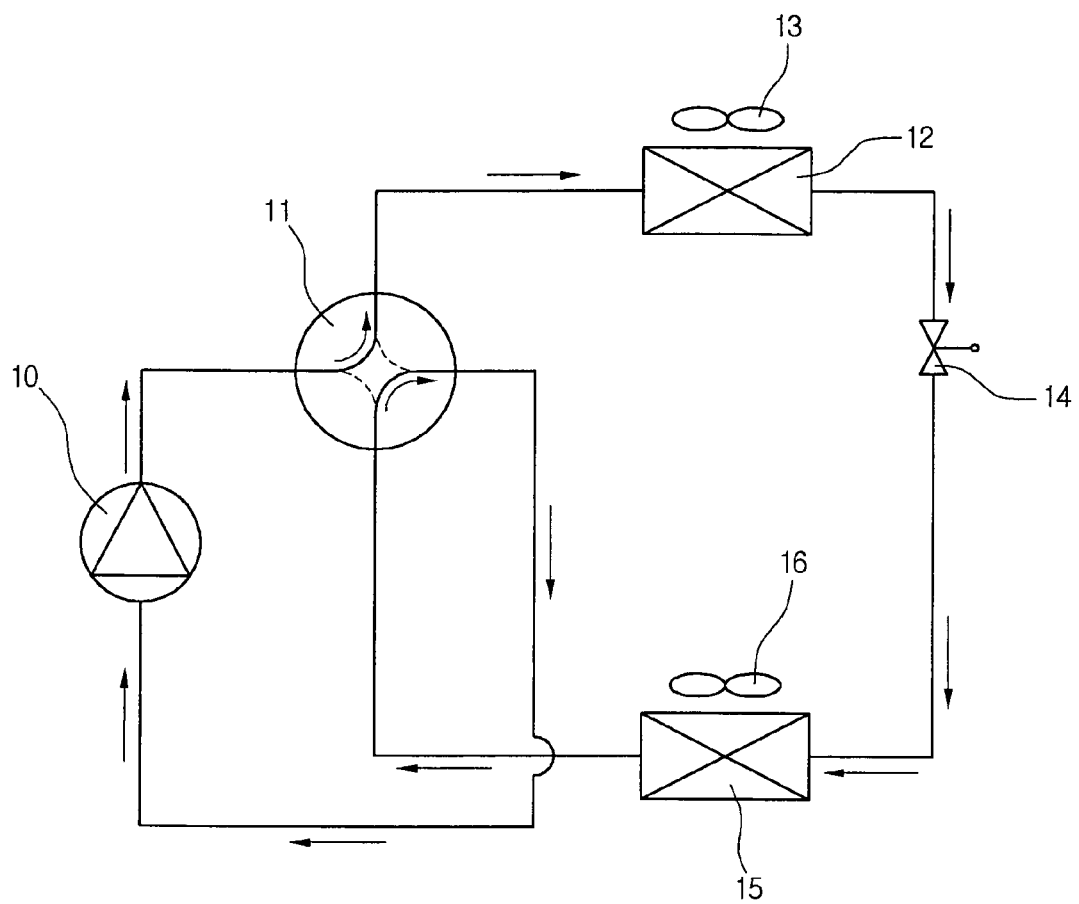
FIG. 1 is a schematic view illustrating a cooling cycle of a heat pump system according to the related art.
Figure 2:
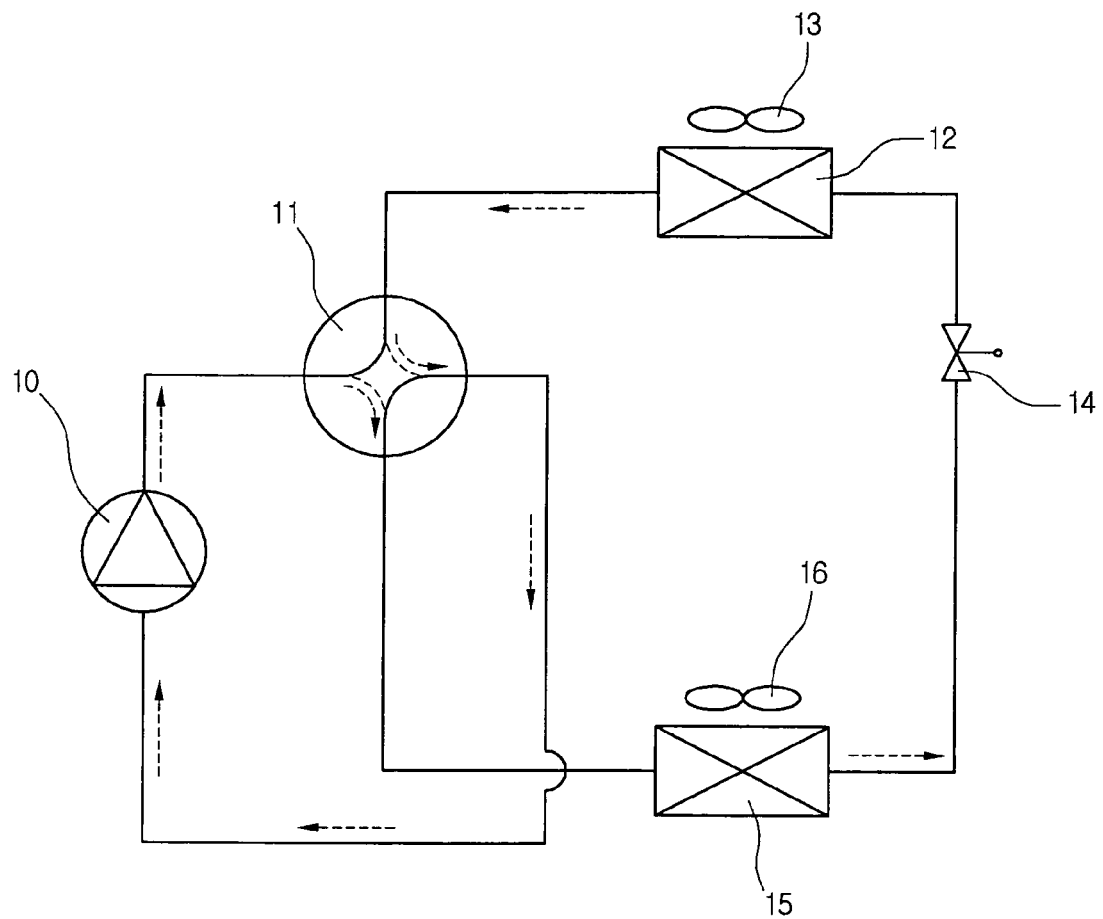
FIG. 2 is a schematic view illustrating a heating cycle of a heat pump system according to the related art.
Figure 3:
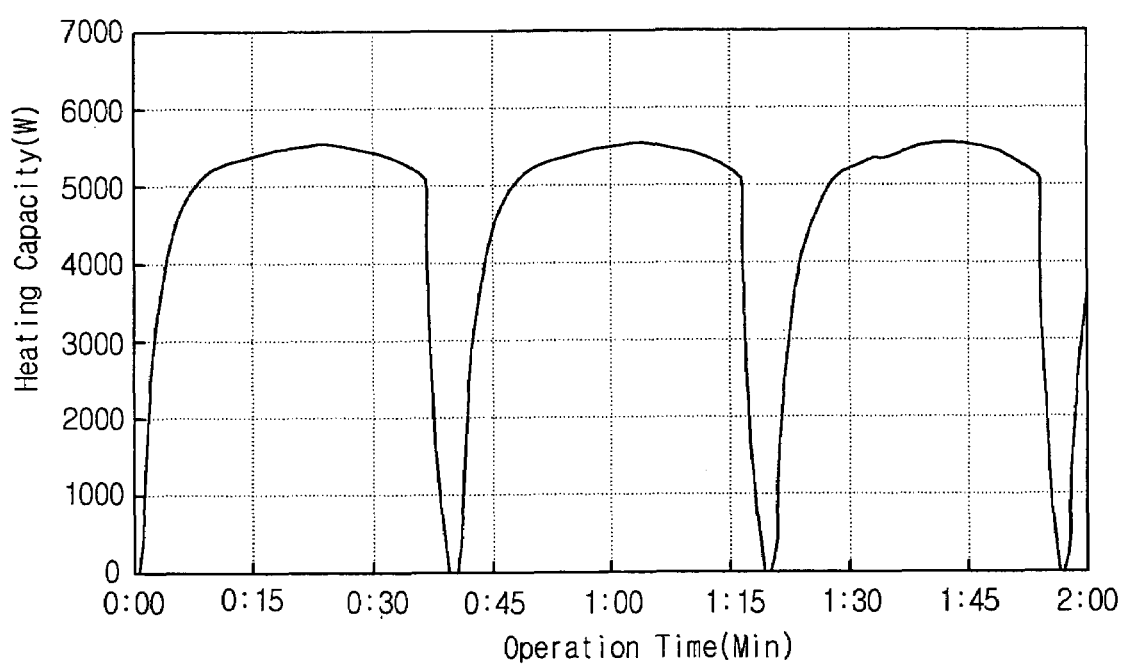
FIG. 3 is a graph illustrating a heating cycle and a defrosting cycle of a heat pump system according to the related art.
Figure 4:
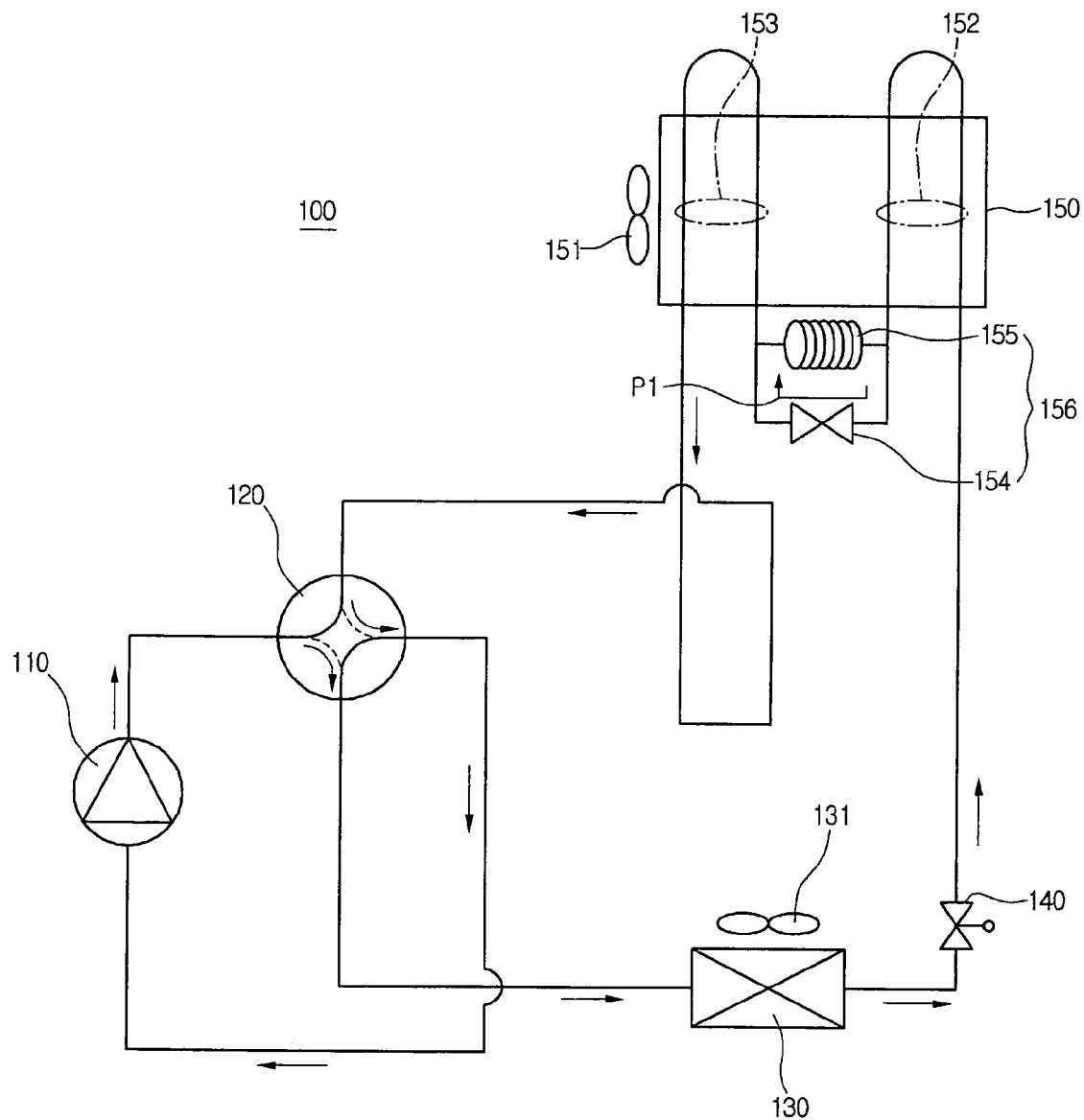
FIG. 4 is a structural view illustrating an apparatus for controlling a heating operation in a heat pump system according to a first embodiment of the present invention.
Figure 5:
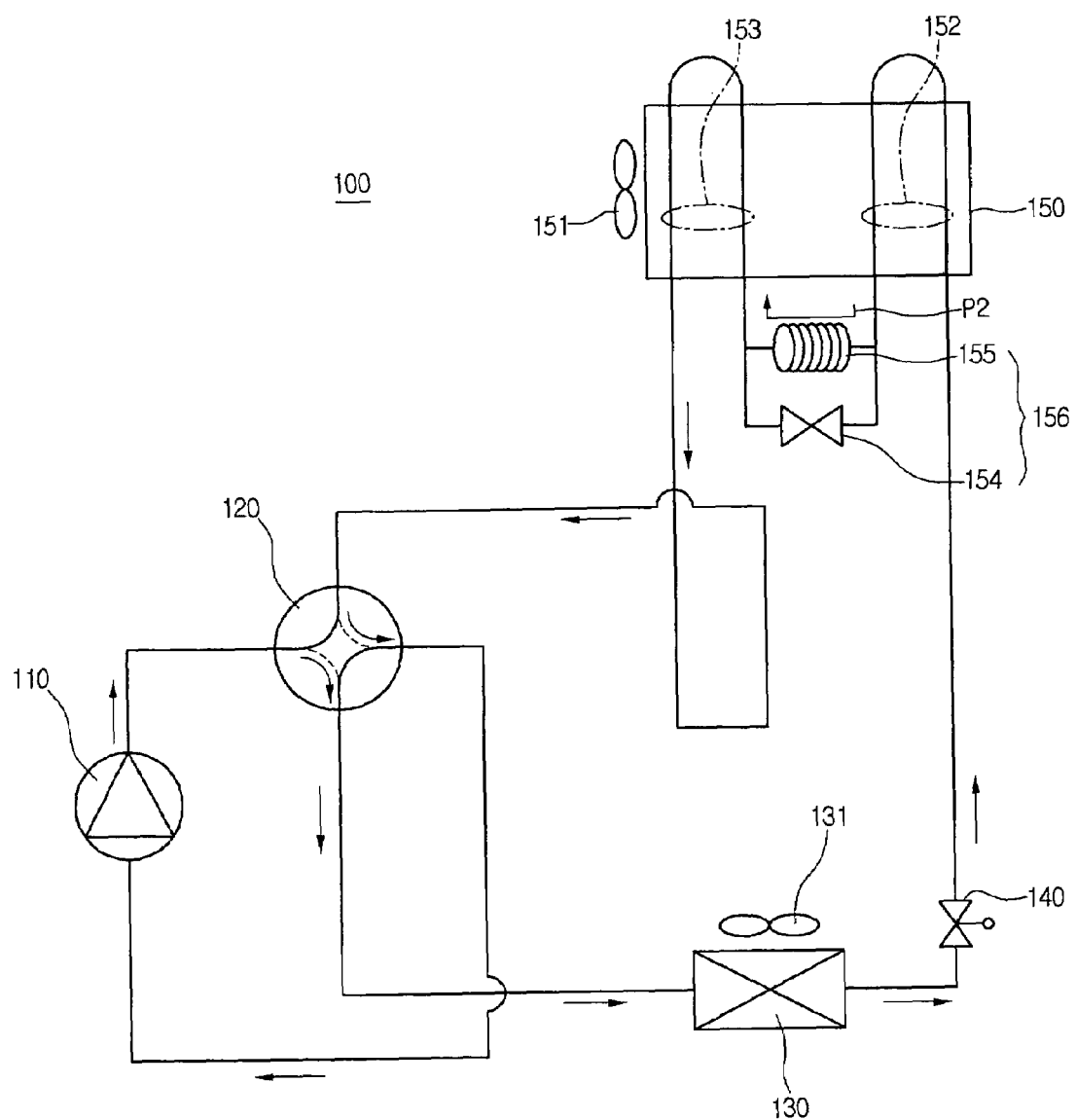
FIG. 5 is a structural view illustrating a combined heating and defrosting operation of a heat pump system according to a first embodiment of the present invention.

FIGS. 4 and 5 illustrate a first embodiment of the present invention. In a first embodiment, a tube region of an outdoor heat exchanger is separated into several parts and a partial defrosting operation and partial evaporating operation are performed therein, so that a heating operation is performed continuously.

An air conditioner 100 is operated in a cooling mode or a heating mode. In the heating mode, the air conditioner 100 performs a heating operation or a defrosting/heating operation, such that the heating operation is not suspended to perform a defrosting operation.

Referring to FIGS. 4 and 5, the air conditioner 100 includes a compressor 110, a passage switching valve 120, an indoor heat exchanger 130, an expansion unit 140, an outdoor heat exchanger 150, and a defrosting control unit 156.

Herein, the defrosting control unit 156 is installed inside or outside of the outdoor heat exchanger 150 and it includes a two-way valve 154 for bypassing a refrigerant and an expansion valve 155 for expanding the refrigerant.

The passage switching valve 120 is switched to the heating mode for the heating operation. The two-way valve 154 of the defrosting control unit is opened and the expansion valve 155 of the defrosting control unit is closed. Here, the passage switching valve acts as a four-way valve.

The compressor 110 compresses an inhaled refrigerant and discharges the refrigerant in a high-temperature and high-pressure vapor phase. The discharged refrigerant flows into the indoor heat exchanger 130 through the passage switching valve 120. The compressor 110 may be a single compressor or an inverter compressor with a constant speed.

At the indoor heat exchanger 130, the high-temperature and high-pressure refrigerant exchanges heat with an indoor air blown to the indoor heat exchanger by an indoor fan 131 in order to heat the indoor air, and the refrigerant is condensed to liquid.

At the expansion unit 140, the condensed refrigerant is expanded into a low-temperature and low-pressure liquid phase, resulting in a pressure drop. At the outdoor heat exchanger 150, the expanded refrigerant is evaporated into a low-temperature and low-pressure vapor phase by exchanging heat with an outdoor air blown by an outdoor fan 151.

In more detail, the refrigerant introduced into the outdoor heat exchanger 150 flows through a first tube region 152, the two-way valve 154 and a second tube region 153 in order to exchange heat with the outdoor air blown to the outdoor heat exchanger 150 by the outdoor fan 151 and to evaporate it into the low-temperature and low-pressure vapor phase. The defrosting control unit 156 is installed between the tube regions and the installation of the defrosting control unit 156 may be changed depending on an arrangement of the tube regions.

The two-way valve 154 connects the first tube region 152 to the second tube region 153 for a flow of the refrigerant, and the expansion valve 155 connected in parallel to the two-way valve is suspended (closed).

Since the low-temperature and low-pressure refrigerant vapor whose phase is changed by the outdoor heat exchanger 150 flows again to the compressor 110, the heating operation continues to be performed.

As described above, when the air conditioner 100 is in the heating operation, a refrigerant passage P1 is formed by the two-way valve 154 disposed between the tube regions 152 and 153 of the outdoor heat exchanger 150.

If the heating operation is performed for a certain time and temperature of the outdoor air is dropped below a predetermined level, a frost starts to be deposited and grows between the tubes of the outdoor heat exchanger 150. That is, since the outdoor heat exchanger 150 exposed to the outdoor air is operated as an evaporator during the heating operation, the tubes of the outdoor heat exchanger 150 is frosted.

A defrosting/heating operation is simultaneously performed to remove the frost on the outdoor heat exchanger 150 without stopping the heating operation. The defrosting/heating operation is repeated with a predetermined time interval during the heating operation.

The defrosting/heating operation is performed in such a manner that the defrosting is done during the heating operation and a start point of the defrosting is determined by sensing a temperature of tubes of the outdoor heat exchanger 150.

Referring to FIG. 5, the expansion unit 140 is fully opened, the two-way valve 154 of the defrosting control unit 156 is closed and the expansion valve of the defrosting control unit is opened. At this time, the defrosting/heating operation is performed with the heating cycle and the defrosting and heating operations are worked together.

When the defrosting/heating operation starts, the refrigerant is compressed into a high-temperature and high-pressure state at the compressor 110. The compressed refrigerant passes through the passage switching valve 120 and is condensed into a liquid phase by the indoor heat exchanger 130 and the indoor fan 131. The condensed refrigerant passes through the expansion unit 140.

The refrigerant passing through the expansion unit 140 flows into the first tube region 152 of the outdoor heat exchanger 150 in order to defrost the first tube region 152. Then, the refrigerant is expanded by the expansion valve 155 while being decompressed. The decompressed and expanded refrigerant is evaporated while passing through the second tube region 153.

That is, the refrigerant flows through a refrigerant passage P2, which is formed by the first tube region 152, the expansion valve 155 and the second tube region 153.

The refrigerant is evaporated into a low-temperature and low-pressure vapor and inhaled to an inlet of the compressor 110. In this manner, a cycle of the defrosting/heating operation is completed.

In other words, in the defrosting/heating operation, the refrigerant is primarily condensed into the refrigerant liquid by the indoor heat exchanger 130 and the indoor fan 131, and then, secondarily condensed into the refrigerant liquid by the first tube region 152 and the outdoor fan 151.

The condensed refrigerant is expanded by the expansion valve 155 disposed between the tube regions 152 and 153 of the outdoor heat exchanger 150. The expanded refrigerant is evaporated at the second tube region 153 of the outdoor heat exchanger 150 through the outdoor fan 151. Here, the refrigerant undergoes the compression, the primary condensation, the secondary condensation, the expansion, and the evaporation in sequence.

Even during the defrosting/heating operation, the indoor air is heated by the heat exchange with the high-temperature and high-pressure refrigerant at the indoor heat exchanger 130, while the defrosting operation is partially carried out at the outdoor heat exchanger 150. Therefore, a separate defrosting operation is not required and the heating operation is continued without any suspension.

When the defrosting over the first tube region 152 is sufficiently carried out, the defrosting/heating operation is stopped and the heating operation is started.

The air conditioner 100 operates in the cooling mode or in the heating mode, as shown in FIGS. 4 and 5. In the heating mode, the air conditioner 100 performs the heating operation or the defrosting/heating operation. The defrosting/heating operation is performed according to a predetermined time interval or a temperature of lower than a predetermined level.

That is, the air conditioner 100 can be operated using either the cooling cycle or the heating cycle. During the heating cycle, the defrosting operation is mostly done in the defrosting/heating cycle and, if necessary, the defrosting operation can be completely done in the cooling cycle.

Since the second tube region 153 of the outdoor heat exchanger 150 is not defrosted, a freeze can be generated between the first tube region 152 and the second tube region 153. Therefore, it is preferable that the defrosting operation is performed on both the first and second tube regions 152 and 153. For this purpose, there is provided a defrosting control valve to switch a defrosting flow of refrigerant according to a second embodiment of the present invention.

SECOND EMBODIMENT

Figure 6:
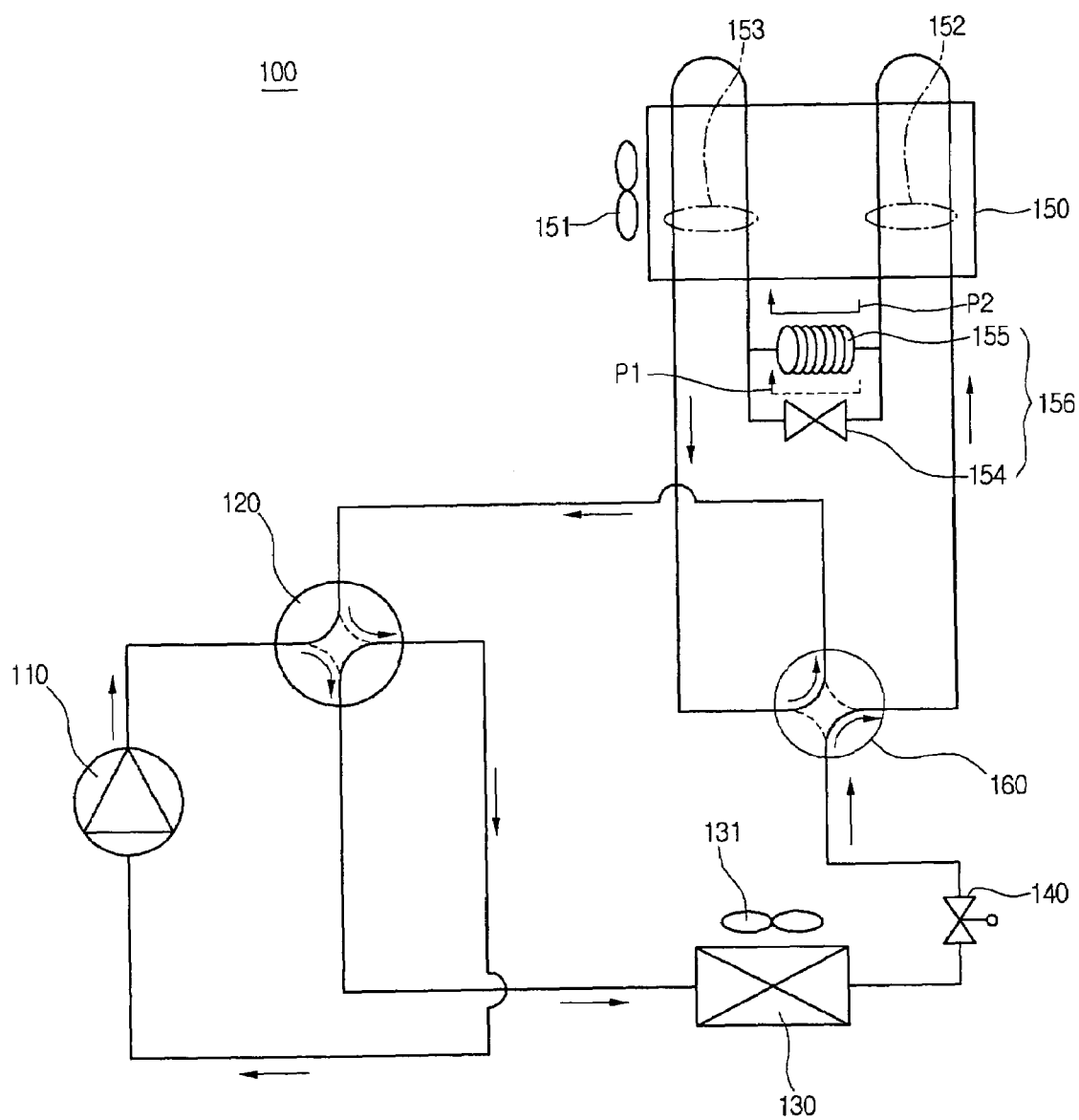
FIG. 6 is a structural view illustrating a defrosting operation of a first tube region of an outdoor heat exchanger according to a second embodiment of the present invention.
Figure 7:
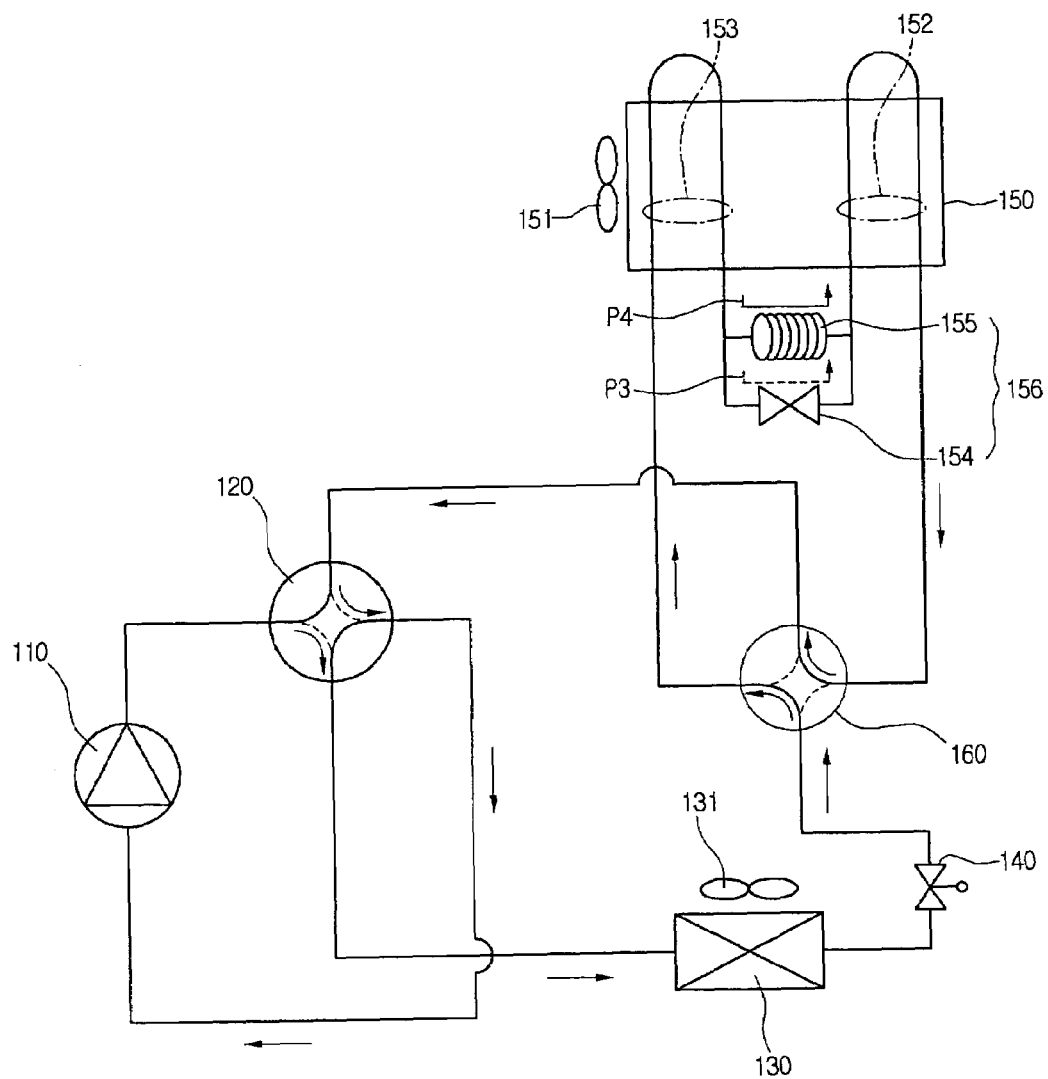
FIG. 7 is a structural view illustrating a defrosting operation of a second tube region of an outdoor heat exchanger according to a second embodiment of the present invention.

FIGS. 6 and 7 show a second embodiment of the present invention. In the second embodiment, a defrosting control valve is provided to sequentially perform a defrosting operation and an evaporating operation on a first tube region and a second tube region of an outdoor heat exchanger.

Referring to FIGS. 6 and 7, an air conditioner 100 is provided with a defrosting control valve 160 for defrosting an entire area of an outdoor heat exchanger 150 while a heating operation is being performed. The defrosting control valve 160 selectively connects an expansion unit 140 with tube regions of the outdoor heat exchanger 150 to determine a region to be defrosted. Here, the defrosting control valve 160 acts as a four-way valve.

A defrosting operation for a first tube region 152 is shown in FIG. 6. The defrosting control valve 160 connects the expansion unit 140 with the first tube region 152 of the outdoor heat exchanger 150 and also connects a second tube region 153 of the outdoor heat exchanger 150 with a passage switching valve 120.

A refrigerant condensed into a liquid state by an indoor heat exchanger 130 passes through the expansion unit 140 and the defrosting control valve 160 and flows to the first tube region 152 of the outdoor heat exchanger 150.

The refrigerant flowing through the first tube region 152 defrosts the first tube region 152. Then, the refrigerant is expanded and decompressed at the same time by an expansion valve 155. The expanded and decompressed refrigerant flows to the second tube region 153 to be evaporated into a low-temperature and low-pressure vapor state. That is, the refrigerant flows along a refrigerant passage P2.

The low-temperature and low-pressure refrigerant vapor passes through the defrosting control valve 160 and the passage switching valve 120 and flows back to the compressor 110. While repeating the circulation through the above-described passages, the refrigerant defrosts the first tube region 152 of the outdoor heat exchanger 150.

After the defrosting is completed, a defrosting operation for the second tube region 153 of the outdoor heat exchanger region 150 is started. Here, whether the defrosting is competed or not is determined using a defrosting time or a temperature of the tubes.

FIG. 7 shows the defrosting operation for the second tube region 153 of the outdoor heat exchanger 150. Referring to FIG. 7, the defrosting control valve 160 connects the expansion unit 140 with the second tube region 153 of the outdoor heat exchanger 150 and also connects the first tube region 152 of the outdoor heat exchanger with the passage switching valve 120.

The refrigerant condensed by the indoor heat exchanger 130 flows through the expansion unit 140 and the defrosting control valve 160 and then flows to the second tube region 153 of the outdoor heat exchanger 150 in order to defrost the second tube region 153.

After passing the second tube region 153 of the outdoor heat exchanger, the refrigerant is expanded and decompressed by the expansion valve 155. The expanded and decompressed refrigerant is evaporated into a low-temperature and low-pressure vapor state while passing through the first tube region 152. Here, the refrigerant flows along a refrigerant passage P4.

The low-temperature and low-pressure refrigerant vapor from the outdoor heat exchanger 150 is inhaled to the compressor 110 after passing through the defrosting control valve 160 and the passage switching valve 120, thereby completing a cycle of the defrosting operation.

As described above, the first tube region 152 and the second tube region 153 of the outdoor heat exchanger 150 are directly exposed in sequence or in turn to the condensed refrigerant liquid (high-temperature and high-pressure refrigerant liquid), such that the defrosting operation is carried out without suspending the heating operation.

That is, the first tube region 152 and the second tube region 153 of the outdoor heat exchanger are defrosted in turn, such that the defrosting operation is performed while the heating operation is being performed.

Further, since the defrosting control valve 160 can be arbitrarily switched to select the tube region to be defrosted while the heating operation is being performed, the refrigerant can flow along both the refrigerant passage P1 and its reverse passage P3.

Figure 8:
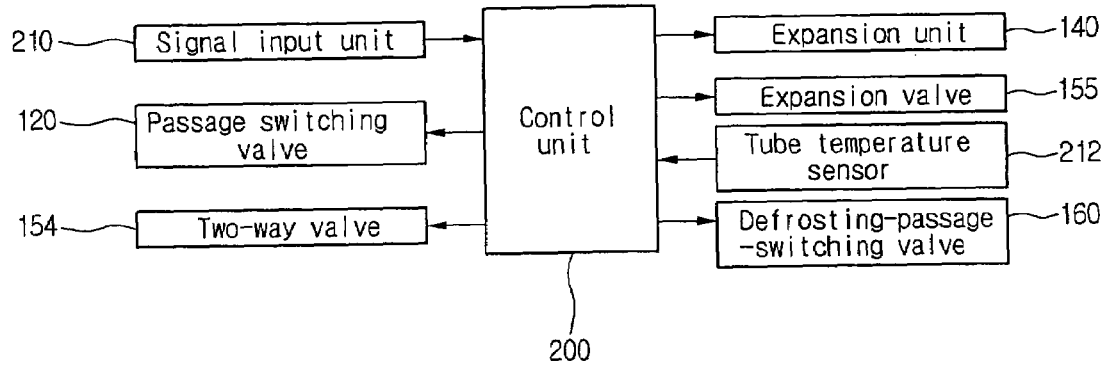
FIG. 8 is a block diagram illustrating an apparatus for controlling a heating operation in heat pump system according to a second embodiment of the present invention.

FIG. 8 is a block diagram illustrating an apparatus for controlling a heating operation in heat pump system shown in FIGS. 6 and 7.

Referring to FIG. 8, in case the air conditioner 100 is powered on, an operation control signal is inputted to a signal input unit 210. Here, when the heating operation is started, a control unit 200 controls the heating cycle according to the inputted operation control signal.

The heating operation uses the heating cycle shown in FIG. 6. For this, the control unit 200 adjusts an opening ratio of the expansion unit 140, opens the two-way valve 154, and closes the expansion valve 155. Under these conditions, the refrigerant flows through the compressor 110, the indoor heat exchanger 130, the expansion unit 140, the first tube region 152 of the outdoor heat exchanger 150, the two-way valve and the second tube region 153 of the outdoor heat exchanger 150 and then flows back to the compressor 110.

The control unit 200 uses a temperature measured by a tube temperature sensor 212, which measures a temperature of the outdoor heat exchanger 150, in order to determine whether the air conditioner 100 is defrosted or not.

The control unit 200 has a reference temperature to determine whether the frost is deposited between the tubes of the outdoor heat exchanger 150. The control unit 200 compares the reference temperature with the temperature of the tubes of the outdoor heat exchanger 150 measured by the tube temperature sensor 212. If the measured temperature is lower than the reference temperature, the control unit 200 determines that the tubes have frozen and thus the defrosting operation is started.

Here, the control unit 200 fully opens the expansion unit 140 for the defrosting/heating operation, keeps the defrosting control valve 160 connecting the expansion unit 140 with the second tube region of the outdoor heat exchanger 150, closes the two-way valve 154, and drives the expansion valve 155 to expand and decompress the refrigerant.

If the first tube region 152 of the outdoor heat exchanger 150 is defrosted and its defrosting is completed, the switching operation of the defrosting control valve 160 is controlled to perform the defrosting operation on the second tube region 153 of the outdoor heat exchanger 150.

That is, if the control unit 200 determines that the defrosting of the first tube region 152 is completed, the control unit 200 controls the second tube region 153 to be defrosted.

Here, the control unit 200 can determine start and completion time points of the defrosting operation using the temperatures of the first tube region 152 and the second tube region 153 of the outdoor heat exchanger 150, in which the temperature are measured by the tube temperature sensor 212.

The control unit 200 switches the defrosting control valve 160. Here, the refrigerant flows to the second tube region 153 of the outdoor heat exchanger 150 after passing through the expansion unit 140 and the defrosting control valve 160 in order to defrost the second tube region 153. Then, the refrigerant is expanded and decompressed at the expansion valve 155 and flows to the first tube region 152 to be changed into the low-temperature and low-pressure refrigerant vapor. The refrigerant vapor flows to the compressor 110.

As described above, if the outdoor heat exchanger is required to be defrosted during the heating operation, the control unit 200 controls the defrosting operation to be performed in turn on the tube regions of the outdoor heat exchanger 150. In other words, a predetermined portion of the tubes is defrosted while the rest portion of the tubes is used for the heating operation and then the defrosted portion of the tubes is used for the heating operation while the rest portion of the tubes is defrosted. Therefore, the control unit 200 makes it possible to defrost the entire outdoor heat exchanger 150 without suspending the heating operation.

Though the tubes of the outdoor heat exchanger 150 is separated into two regions in this embodiment, the tubes can be separated into more than two regions by adding additional two-way valve(s) and expansion valve(s).

In the defrosting control unit 156, the two-way valve 154 is a bypass valve and the expansion valve 155 is a capillary tube.

According to another embodiment of the present invention, a linear expansion valve (LEV) may be used for the defrosting control unit 156 or an LEV and an expansion valve may be used in parallel for the defrosting control unit 156. Their detailed descriptions will now be made more fully with reference to FIGS. 9 and 10.

THIRD EMBODIMENT

Figure 9:
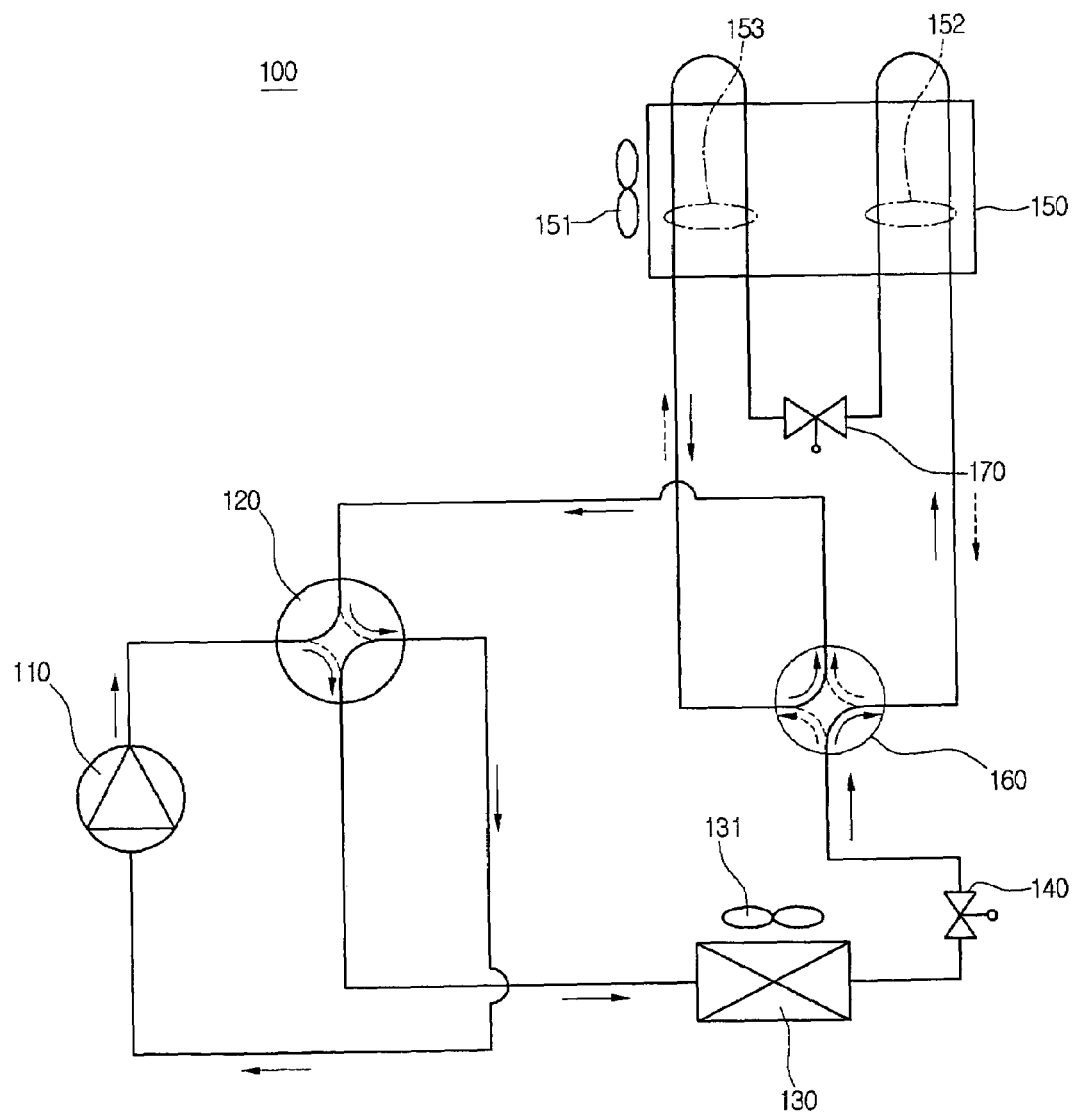
FIG. 9 is a structural view illustrating an apparatus for controlling a heating operation in a heat pump system according to a third embodiment of the present invention.

FIG. 9 is a structural view of a heat pump system, which uses an LEV for a defrosting control unit according to a third embodiment of the present invention.

Referring to FIG. 9, an LEV 170 is installed between a first tube region 152 and a second tube region 153 of an outdoor heat exchanger 150. In a heating mode, the LEV 170 is fully opened to pass a refrigerant therethrough. In a defrosting/heating mode, the LEV 170 adjusts its opening to expand and decompress the refrigerant.

In the defrosting/heating mode, the first tube region 152 is defrosted when the refrigerant flows along the solid line arrows by a switching of a defrosting control valve 160. Herein, the refrigerant flows in sequence through the first tube region 152 for defrosting the first tube region 152, the LEV 170 while expanded and decompressed, and the second tube region 153 to be evaporated.

The second tube region 152 is defrosted when the refrigerant flows along dashed line arrows by the switching of the defrosting control valve 160. Herein, the refrigerant flows in sequence through the second tube region 153 for defrosting the second tube region 153, the LEV 170 while expanded and decompressed, and the first tube region 153 to be evaporated.

At least one the LEV may be installed. When two or more LEVs are installed, they are preferably installed in parallel. Further, instead of the LEV, an electronic expansion valve (EEV) may be installed.

FORTH EMBODIMENT

Figure 10:
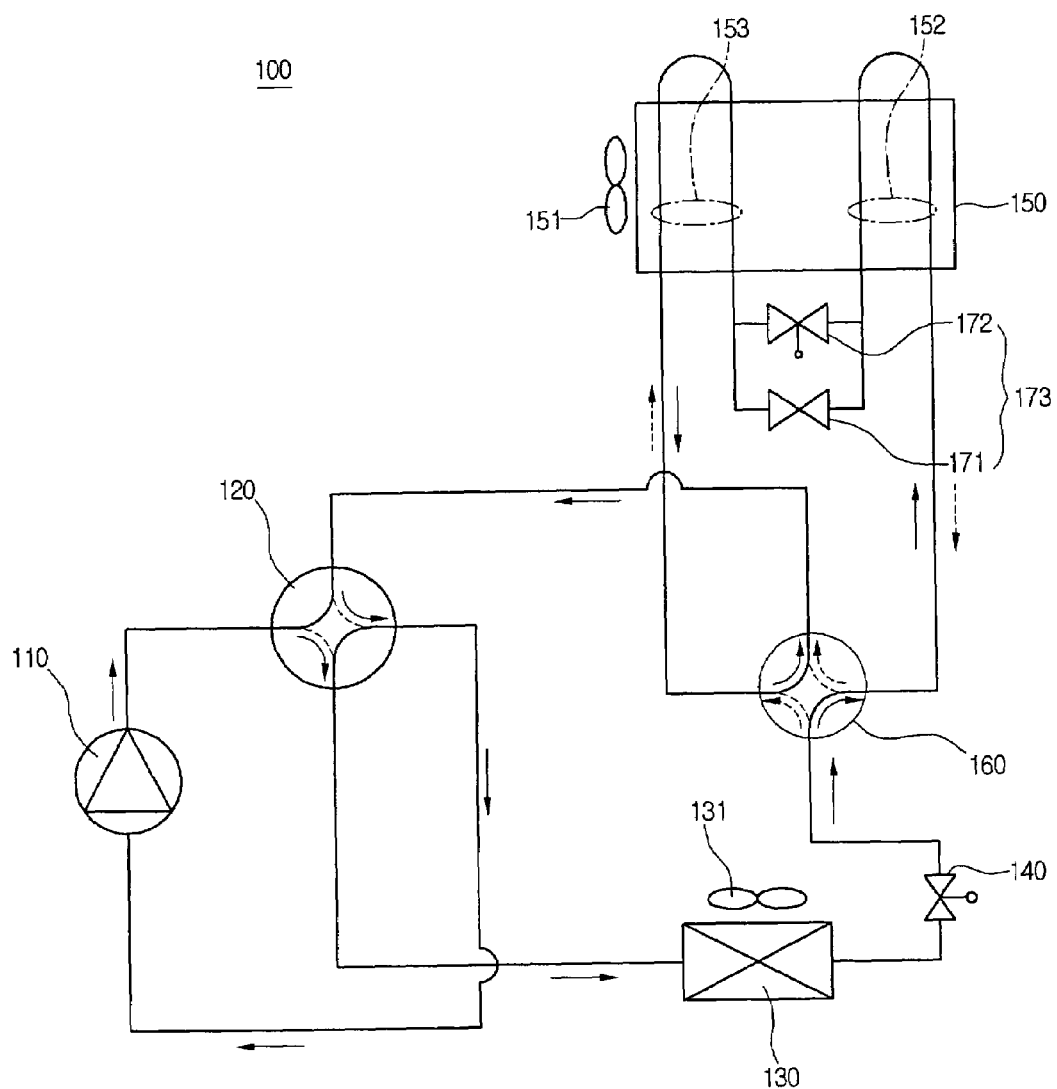
FIG. 10 is a structural view illustrating an apparatus for controlling a heating operation in a heat pump system according to a forth embodiment of the present invention.

FIG. 10 shows a forth embodiment of the present invention. In the forth embodiment, a two-way valve 171 and an LEV 172 are used for a defrosting control unit 173.

Referring to FIG. 10, the two-way valve 171 is installed between a first tube region 152 and a second tube region 153 of an outdoor heat exchanger 150, and the LEV 172 is installed in parallel with the two-way valve. The two-way valve 171 is opened to pass a refrigerant therethrough in a heating mode and closed in a defrosting/heating mode. The LEV 172 is closed in the heating mode and opened in the defrosting/heating mode.

In the defrosting/heating mode, the first tube region 152 is defrosted when the refrigerant flows along the solid line arrows by a switch of a defrosting control valve 160. Here, the refrigerant flows in sequence through the first tube region 152 for defrosting the first tube region 152, the LEV 172 while expanded and decompressed, and the second tube region 153 to be evaporated.

The second tube region 152 is defrosted when the refrigerant flows along the dashed line arrows by the switch of the defrosting control valve 160. Here, the refrigerant flows in sequence through the second tube region 153 for defrosting the second tube region 153, the LEV 170 while expanded and decompressed, and the first tube region 153 to be evaporated. Instead of the LEV, an EEV may be installed.

According to the above-mentioned embodiments, the defrosting operation of the outdoor heat exchanger 150 may be started at the first tube region 152 and ended at the second tube region 153. On the contrary, the defrosting operation may be started at the second tube region 153 and ended at the first tube region 152. The period of the defrosting operation for the first and second tube regions 152 and 153 depends on a heating efficiency. The period may be repeated at least one time during the defrosting operation.

Further, the switching of the defrosting control valve 160 is carried out without stopping or restarting the compressor 110. That is, though the compressor 110 is stopped and restarted for changing the modes from the heating to the defrosting (cooling) according to the related art, the compressor 110 need not be stopped and restarted for changing the mode according to the present invention, because the defrosting operation can be performed while the heating operation is being performed.

Figure 11:
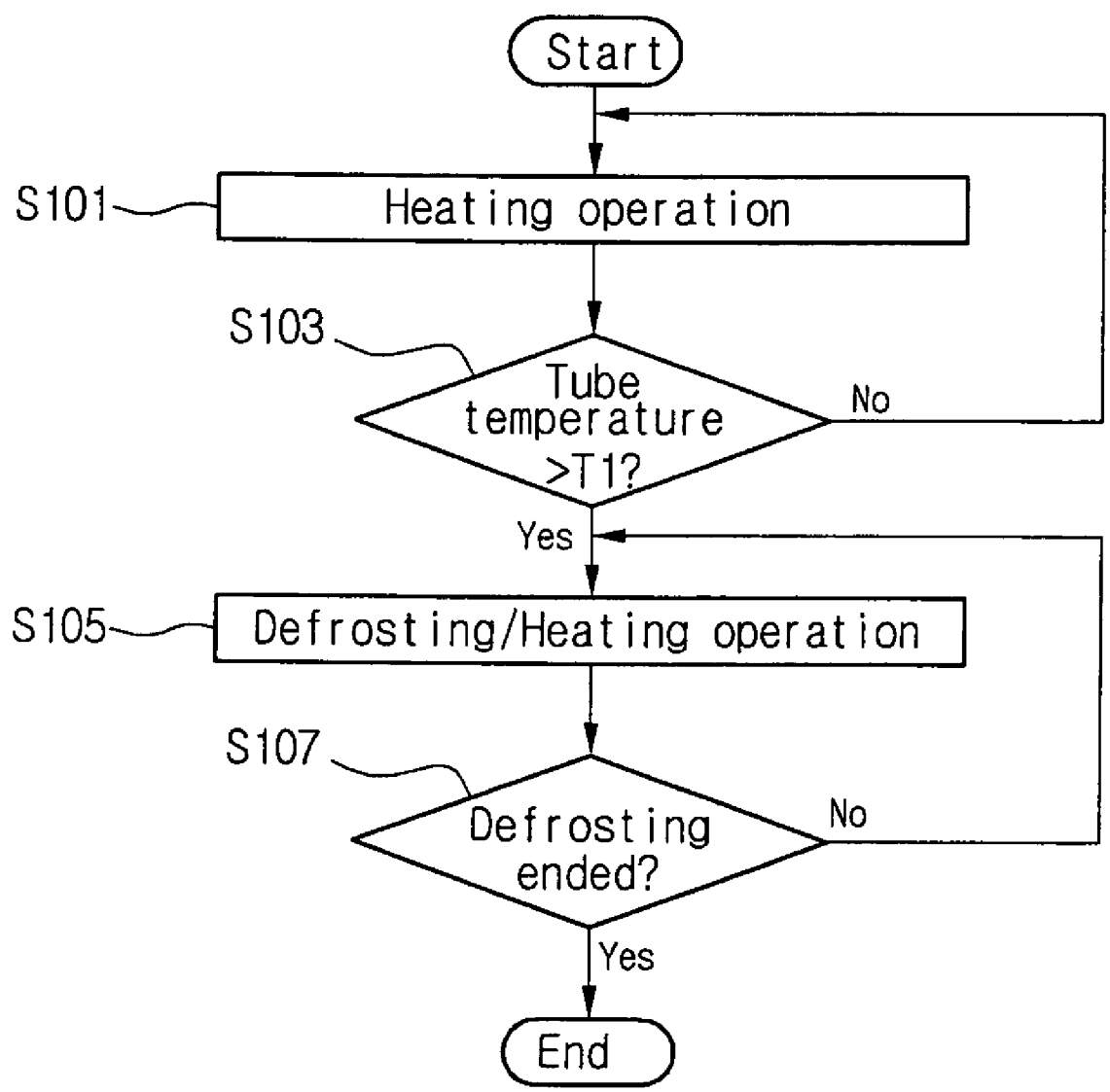
FIG. 11 is a flowchart illustrating a method for controlling a heating operation in a heat pump system according to the present invention.

FIG. 11 is a flowchart illustrating a method for controlling a heating operation in a heat pump system according to the present invention Referring to FIG. 11, a method for controlling a heating operation in a heat pump system includes: starting the heating operation (S101); detecting a temperature of the tubes of the outdoor heat exchanger during the heating operation (S103); if the temperature is lower than or equal to a predetermined temperature (T1), performing the heat pump system in the defrosting/heating mode (S105); and if the defrosting operation is completed, continuing to perform the heating operation.

Figure 12:
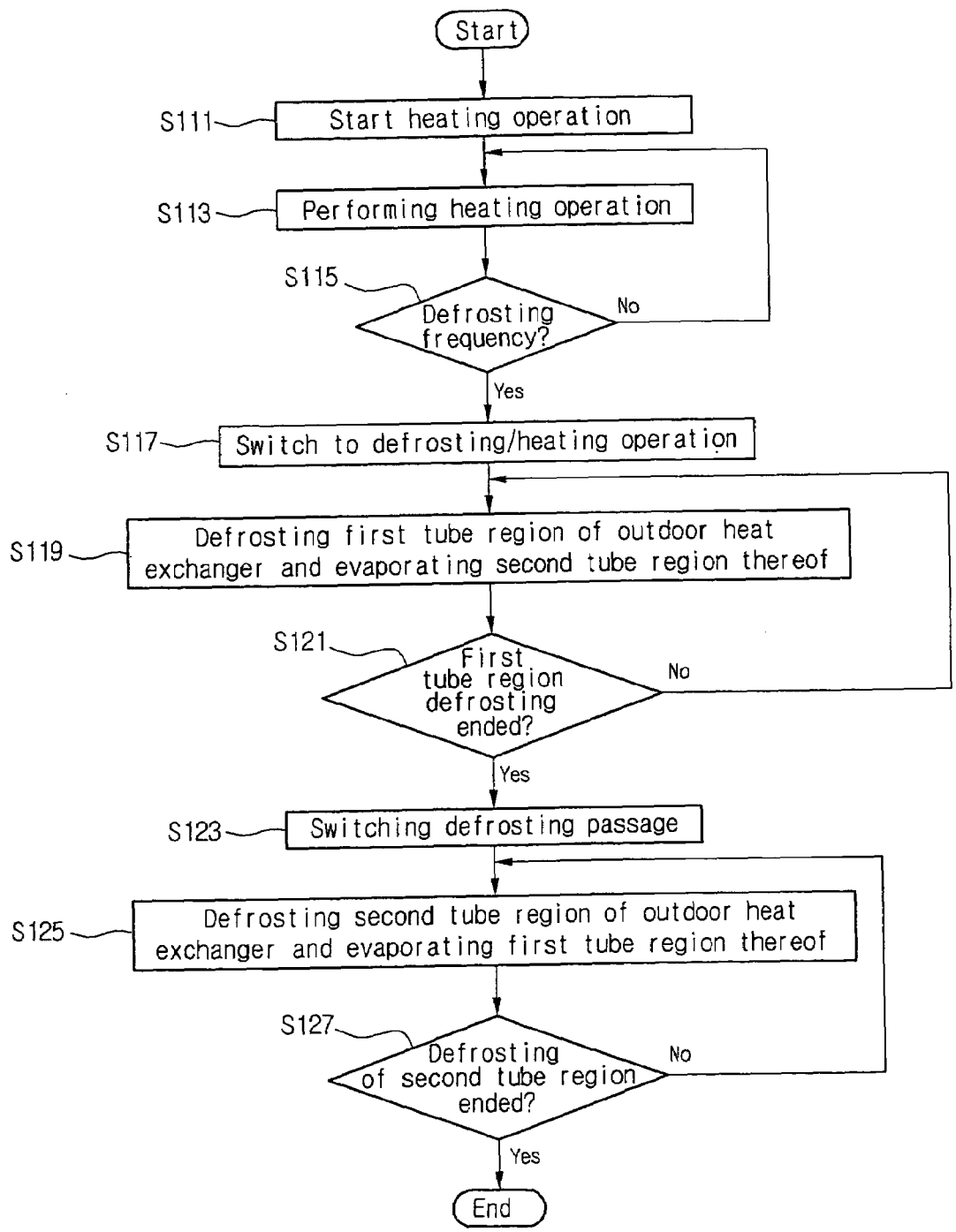
FIG. 12 is a detailed flowchart illustrating a method for controlling a heating operation in a heat pump system according to the present invention.

FIG. 12 is a detailed flowchart of the heating mode and the defrosting/heating mode according to the present invention.

Referring to FIG. 12, the heating operation starts in operation (S111), which is followed by operation S113. Then, the passage switching valve is switched to the heating mode and the defrosting control unit executes a bypass function, such that the heating cycle is operated normally (S113).

Then, it is checked whether the operation mode is the defrosting/heating mode or not (S115). If the operation mode is the defrosting/heating mode, the two-way valve is closed and the expansion valve is fully opened to pass the refrigerant without expansion and decompression of the refrigerant (S117).

The refrigerant that is condensed at the indoor heat exchanger flows through the expansion unit and the first tube region of the outdoor heat exchanger in order to defrost the first tube region, and the refrigerant used for the defrosting is expanded and decompressed at the expansion valve and then evaporated at the second tube region of the outdoor heat exchanger. Then, the evaporated refrigerant flows to the compressor (S119).

Then, it is checked whether the defrosting of the first tube region is complete or not (S121). If the defrosting of the first tube region is not completed, the process proceeds to the step S119. If the defrosting of the first tube region is completed, the defrosting control valve is switched to the second tube region in order to defrosting the second tube region (S123).

Then, the refrigerant that passed through the indoor heat exchanger, the expansion unit and the defrosting control valve in sequence flows to the second tube region of the outdoor heat exchanger for defrosting the second tube region. The refrigerant used for the defrosting is expanded and decompressed at the expansion valve and then evaporated at the first tube region of the outdoor heat exchanger (S125). The evaporated refrigerant flows to the compressor.

Then, it is checked whether the defrosting of the second tube region is complete or not (S127). If the defrosting of the second tube region is completed, the heating operation alone is performed. If the defrosting of the second tube region is not completed, the process proceeds to the step S125.

As described above, without suspending the heating operation, the defrosting operation is performed in sequence on a portion of the tubes of the outdoor heat exchanger (the first tube region) and the rest portion of the tubes of the outdoor heat exchanger (the second tube region), such that the continuous heating operations are attained and the compressor need not be stopped.

Further, though the second defrosting operation for the rest portion of the tubes is performed after completing the first defrosting operation for the one portion of the tubes, the defrosting operation for the two portions can be automatically performed in sequence according to a predetermined period. Furthermore, though the defrosting operation is performed when the operation mode is the defrosting/heating mode, the defrosting operation can be automatically performed when a temperature of indoor air is higher than or equal to a predetermined temperature.

The apparatus for the present invention performs the heating operation and the defrosting operation at the same time when the temperature of the outdoor heat exchanger is lower than a predetermined temperature, such that the apparatus has an improved heating efficiency without freezing the tubes of the outdoor heat exchanger.

According to the heat pump system of the present invention, the defrosting operation of the outdoor heat exchanger is performed in sequence on the portions of the tubes thereof while the heating operation is not being suspended, such that the heating efficiency is improved, and unnecessary stopping and restarting actions of the compressor is not required.

Further, since the defrosting operation is performed during the heating operation, the defrosting operation does not suspend the heating operation.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An apparatus for controlling a heating operation in a heat pump system, the apparatus comprising:
   at least one compressor for compressing a refrigerant into a high-temperature and high-pressure refrigerant vapor;
   a passage switching unit for switching a refrigerant circulation passage depending on a heating mode or a cooling mode;
   an indoor heat exchanger for condensing the high-temperature and high-pressure refrigerant vapor for a heating operation or a defrosting/heating operation of the heating mode;

an expansion unit through which the condensed refrigerant passes during the defrosting/heating operation;

an outdoor heat exchanger for defrosting at least one tube region by using the condensed refrigerant discharged from the expansion unit; and a defrosting control unit for expanding and decompressing the refrigerant that flows between the tube regions, or for bypassing the refrigerant.

2. The apparatus according to claim 1, wherein the outdoor heat exchanger is separated into at least two tube regions by the defrosting control unit, and the at least two tube regions acts as a defrosting region and as an evaporation region during the defrosting/heating operation.

3. The apparatus according to claim 1, wherein the defrosting control unit is installed between a first tube region at an inlet side of the outdoor heat exchanger and a second tube region at an outlet side of the outdoor heat exchanger.

4. The apparatus according to claim 1, wherein the defrosting control unit includes:

a bypass valve for connecting the tube regions and bypassing the refrigerant during the heating operation; and an expansion valve connected in parallel with the bypass valve, for expanding and decompressing the refrigerant during the defrosting/heating operation.

5. The apparatus according to claim 4, wherein the expansion valve is one of a capillary tube and an LEV (linear expansion valve).

6. The apparatus according to claim 1, wherein the defrosting control unit connects the tube regions and bypasses the refrigerant during the heating operation, the defrosting control unit including an LEV which expands and decompresses the refrigerant during the defrosting/heating operation.

7. The apparatus according to claim 1, wherein the outdoor heat exchanger includes a defrosting passage switching valve which selectively switches the tube regions for defrosting the tube regions in turn.

8. The apparatus according to claim 7, wherein the defrosting passage switching valve is a four-way valve for connecting the expansion unit with an inlet and an outlet of the outdoor heat exchanger.

9. The apparatus according to claim 7, wherein the defrosting passage switching valve carries out the switching operation without stopping or restarting the compressor.

10. The apparatus according to claim 1, wherein the heating operation or the defrosting/heating operation of the heating mode is performed by the same circulation cycle.

11. The apparatus according to claim 1, wherein the defrosting/heating operation is started when a defrosting is started during the heating mode, the tube region located between the expansion unit and the defrosting control unit is defrosted by the condensed refrigerant passing through the expansion unit, and the refrigerant is expanded and decompressed by the defrosting control unit and then evaporated at the tube region located between the defrosting control unit and the compressor.

12. An apparatus for controlling a heating operation in a heat pump system, the apparatus comprising:

at least one compressor for compressing a refrigerant into a high-temperature and high-pressure refrigerant vapor;

a passage switching unit for switching a refrigerant circulation passage depending on a heating mode or a cooling mode;

an indoor heat exchanger for condensing the high-temperature and high-pressure refrigerant vapor for a heating operation or a defrosting/heating operation of the heating mode;

an expansion unit through which the condensed refrigerant passes during the defrosting/heating operation;

an outdoor heat exchanger for defrosting at least one tube region by using the condensed refrigerant that have passed the expansion unit;

a defrosting control unit for expanding and decompressing the refrigerant that flows between the tube regions, or for bypassing the refrigerant for the heating mode;

a defrosting passage switching valve for switching a refrigerant passage formed between the expansion unit and the outdoor heat exchanger in order to defrost the tube regions of the heat exchanger in turn; and a control unit for controlling the expansion unit, the defrosting control unit, and the defrosting passage switching valve according to the heating operation or the defrosting/heating operation.

13. The apparatus according to claim 12, wherein the defrosting control unit includes:

a two-way valve connected between a first region and a second tube region of the outdoor heat exchanger, for bypassing the refrigerant during the heating operation; and an expansion valve connected in parallel with the two-way valve, for expanding and decompressing the refrigerant during the defrosting/heating operation.

14. The apparatus according to claim 12, wherein the control unit changes from the heating operation to the defrosting/heating operation according to a temperature measured by a tube temperature sensor, the tube temperature sensor being installed at each of the tube regions of the outdoor heat exchanger, and the control unit controls a defrosting frequency of the tube regions.

15. The apparatus according to claim 12, wherein the defrosting control unit includes an expansion valve for connecting the tube regions of the outdoor heat exchanger, bypassing the refrigerant during the heating operation, and expanding and decompressing the refrigerant during the defrosting/heating operation.

16. A method for controlling a heating operation in a heat pump system including a compressor, a passage switching unit, an indoor heat exchanger, an outdoor heat exchanger and expansion unit, the method comprising:

performing a heating operation using a heating cycle; and performing a defrosting/heating operation of defrosting one side of the outdoor heat exchanger and evaporating the other side of the outdoor exchanger in turn, wherein the defrosting/heating operation is performed with a predetermined frequency.

17. The method according to claim 16, wherein the defrosting/heating operation comprises:

checking whether or not the defrosting/heating operation is carried out during the heating operation;

if the defrosting/heating operation is carried out, passing a refrigerant condensed at the indoor heat exchanger through the expansion unit, and defrosting an inlet tube region of the outdoor heat exchanger using the passed refrigerant;

expanding and decompressing the refrigerant using an expansion valve, the expansion valve being installed between the tube regions of the outdoor heat exchanger; and evaporating the expanded and decompressed refrigerant at an outlet tube region of the outdoor heat exchanger.

18. The method according to claim 17, wherein refrigerant passages of the inlet and outlet tube regions of the outdoor heat exchanger are switched to defrost the entire tube regions.

19. The method according to claim 16, wherein the heating operation and the defrosting/heating operation are performed without stopping or restarting the compressor.

* * * * *